(12) United States Patent
Mizuno (10) Patent No.: US 12,094,430 B2
(45) Date of Patent: Sep. 17, 2024

(54) FIELD-SEQUENTIAL PROJECTOR DEVICE, HEAD-UP DISPLAY DEVICE, PROGRAM, AND VOLTAGE MEASUREMENT METHOD

(71) Applicant: NIPPON SEIKI CO., LTD., Niigata (JP)

(72) Inventor: Sayaka Mizuno, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 162 days.

(21) Appl. No.: 17/796,984

(22) PCT Filed: Feb. 24, 2021

(86) PCT No.: PCT/JP2021/006794
§ 371 (c)(1),
(2) Date: Aug. 2, 2022

(87) PCT Pub. No.: WO2021/172332
PCT Pub. Date: Sep. 2, 2021

(65) Prior Publication Data
US 2023/0344968 A1 Oct. 26, 2023

(30) Foreign Application Priority Data
Feb. 27, 2020 (JP) .................. 2020-031262

(51) Int. Cl.
*G01K 7/01* (2006.01)
*G02B 27/01* (2006.01)
(Continued)

(52) U.S. Cl.
CPC ............ *G09G 3/346* (2013.01); *G02B 27/01* (2013.01); *G09G 3/002* (2013.01);
(Continued)

(58) Field of Classification Search
None
See application file for complete search history.

(56) References Cited

U.S. PATENT DOCUMENTS

| | | | |
|---|---|---|---|
| 2009/0237617 A1* | 9/2009 | Inoshita | G03B 21/14 353/121 |
| 2011/0031903 A1* | 2/2011 | Nguyen Hoang | H05B 45/56 374/178 |
| 2014/0253821 A1* | 9/2014 | Takatoh | G02B 27/0101 349/11 |

FOREIGN PATENT DOCUMENTS

| | | |
|---|---|---|
| EP | 2170012 A1 | 3/2010 |
| JP | 2010-86667 A | 4/2010 |

(Continued)

OTHER PUBLICATIONS

International Search Report issued in corresponding International Application No. PCT/JP2021/006794, dated May 11, 2021, w/ English Translation (4 pages).

*Primary Examiner* — Carl Adams
(74) *Attorney, Agent, or Firm* — Rimon P.C.

(57) ABSTRACT

A projector device includes: a storage unit storing lighting pattern information indicating the lighting start timing of an LED and the time sequence of a lighting continuation period from the lighting start timing; a drive control unit that causes the LED to light on the basis of the lighting pattern information; and a voltage measurement unit. The voltage measurement unit refers to the lighting pattern information and determines, for a target period, a lighting continuation period that is longer than a preset set period. The voltage measurement unit measures the forward voltage within the determined target period from the start of the period until a timing after the set period has elapsed.

9 Claims, 11 Drawing Sheets

(51) Int. Cl.
*G09G 3/00* (2006.01)
*G09G 3/34* (2006.01)
*H04N 9/31* (2006.01)
*G09G 3/32* (2016.01)

(52) U.S. Cl.
CPC .......... *H04N 9/3105* (2013.01); *H04N 9/312* (2013.01); *G02B 2027/0112* (2013.01); *G09G 3/32* (2013.01); *G09G 2310/0235* (2013.01); *G09G 2310/08* (2013.01)

(56) References Cited

FOREIGN PATENT DOCUMENTS

| | | |
|---|---|---|
| JP | 2012-216299 A | 11/2012 |
| JP | 2017-33645 A | 2/2017 |
| JP | 2018-200814 A | 12/2018 |
| WO | 2019/139021 A1 | 7/2019 |

* cited by examiner

| Color | Start (μs) | Duration (μs) | |
|---|---|---|---|
| R | t1 | 120 | |
| G | t2 | 120 | |
| B | t3 | 17 | |
| R | t4 | 370 | ---▶ Pr |
| G | t5 | 300 | ---▶ Pg |
| R | t6 | 20 | |
| G | t7 | 17 | |
| B | t8 | 400 | ---▶ Pb |
| R | t9 | 130 | |
| B | t10 | 120 | |
| ⋮ | ⋮ | ⋮ | |

FIELD-SEQUENTIAL PROJECTOR DEVICE, HEAD-UP DISPLAY DEVICE, PROGRAM, AND VOLTAGE MEASUREMENT METHOD

CROSS REFERENCE TO RELATED APPLICATIONS

This application is the U.S. National Phase under 35 U.S.C. § 371 of International Application No. PCT/JP2021/006794, filed on Feb. 24, 2021, which claims the benefit of Japanese Application No. 2020-031262, filed on Feb. 27, 2020, the entire contents of each are hereby incorporated by reference.

TECHNICAL FIELD

The present disclosure relates to a field-sequential projector device, a head-up display device, a program, and a voltage measurement method.

BACKGROUND ART

For example, Patent Literature 1 describes one example of a field-sequential projector device. The projector device described in Patent Literature 1 generates the display light representing an image by a display element including a DMD (Digital Micromirror Device) based on the light emitted by a plurality of light-emitting diodes having different lighting colors from each other, i.e., red, green, and blue. In the field-sequential method, the light-emitting diodes are sequentially lighted for a short period (hereinafter referred to as lighting duration period) in units of is to express a mixed color using the afterimage phenomenon.

PRIOR ART DOCUMENT

Patent Document

Patent Literature 1: Japanese Unexamined Patent Application Publication No. 2017-33645

SUMMARY OF THE INVENTION

Problems to be Solved by the Invention

In the above-described projector device, in order to diagnose the status of the light-emitting diode, the forward voltage of the light-emitting diode is measured during the lighting duration period. To avoid the period in which the voltage becomes unstable immediately after the lighting of the light-emitting diode starts, the forward voltage is measured after a setting period has elapsed from the start of lighting of the light-emitting diode. However, it is typical that, as the specification of an IC (Integrated Circuit) that drives and controls the light-emitting diode, the supplier of the IC previously determines in which period among the intermittently appearing lighting duration periods the forward voltage is measured. In a case where the measurement timing according to the specification of the IC is used as it is, it may be difficult to properly measure the forward voltage when the lighting duration period is a very short period, such as several tens of μs.

The present disclosure has been made in consideration of the above actual circumstances and has an object to provide a field-sequential projector device, a head-up display device, a program, and a voltage measurement method with which it is possible to measure the forward voltage of the light-emitting diode during an appropriate lighting duration period.

Solution to Problem

In order to achieve the above-described object, a field-sequential projector device according to a first aspect of the present disclosure includes a light-emitting diode, a storage unit that stores lighting pattern information that is information for lighting the light-emitting diode in a preset lighting pattern and that indicates a time sequence of a lighting start timing of the light-emitting diode and a lighting duration period from the lighting start timing, a drive control unit that lights the light-emitting diode in the lighting pattern based on the lighting pattern information, a display element that generates display light representing an image based on light emitted by the light-emitting diode, and a voltage measurement unit that measures a forward voltage of the light-emitting diode, wherein the voltage measurement unit refers to the lighting pattern information and determines that the lighting duration period longer than a preset setting period is a target period, and executes a voltage measurement process to measure the forward voltage within the determined target period at a timing after the setting period has elapsed from start of the period.

In order to achieve the above-described object, a head-up display device according to a second aspect of the present disclosure includes the projector device and emits the display light toward a translucent member to display a virtual image of the image.

In order to achieve the above-described object, a program according to a third aspect of the present disclosure causes a computer to function as a drive control means that lights a light-emitting diode included in a field-sequential projector device in a preset lighting pattern based on lighting pattern information for lighting the light-emitting diode in the lighting pattern, and a voltage measurement means that measures a forward voltage of the light-emitting diode, wherein the lighting pattern information indicates a time sequence of a lighting start timing of the light-emitting diode and a lighting duration period from the lighting start timing, and the voltage measurement means refers to the lighting pattern information and determines that the lighting duration period longer than a preset setting period is a target period, and measures the forward voltage within the determined target period at a timing after the setting period has elapsed from start of the period.

In order to achieve the above-described object, a voltage measurement method according to a fourth aspect of the present disclosure includes a step of lighting a light-emitting diode included in a field-sequential projector device in a preset lighting pattern based on lighting pattern information for lighting the light-emitting diode in the lighting pattern, and a voltage measurement step of measuring a forward voltage of the light-emitting diode, wherein the lighting pattern information indicates a time sequence of a lighting start timing of the light-emitting diode and a lighting duration period from the lighting start timing, and the voltage measurement step refers to the lighting pattern information and determines that the lighting duration period longer than a preset setting period is a target period, and measures the forward voltage within the determined target period at a timing after the setting period has elapsed from start of the period.

Effect of the Invention

According to the present disclosure, the forward voltage of the light-emitting diode may be measured during an appropriate lighting duration period.

MODE FOR CARRYING OUT THE INVENTION

One embodiment of the present disclosure will be described with reference to the drawings.

Figure 1:
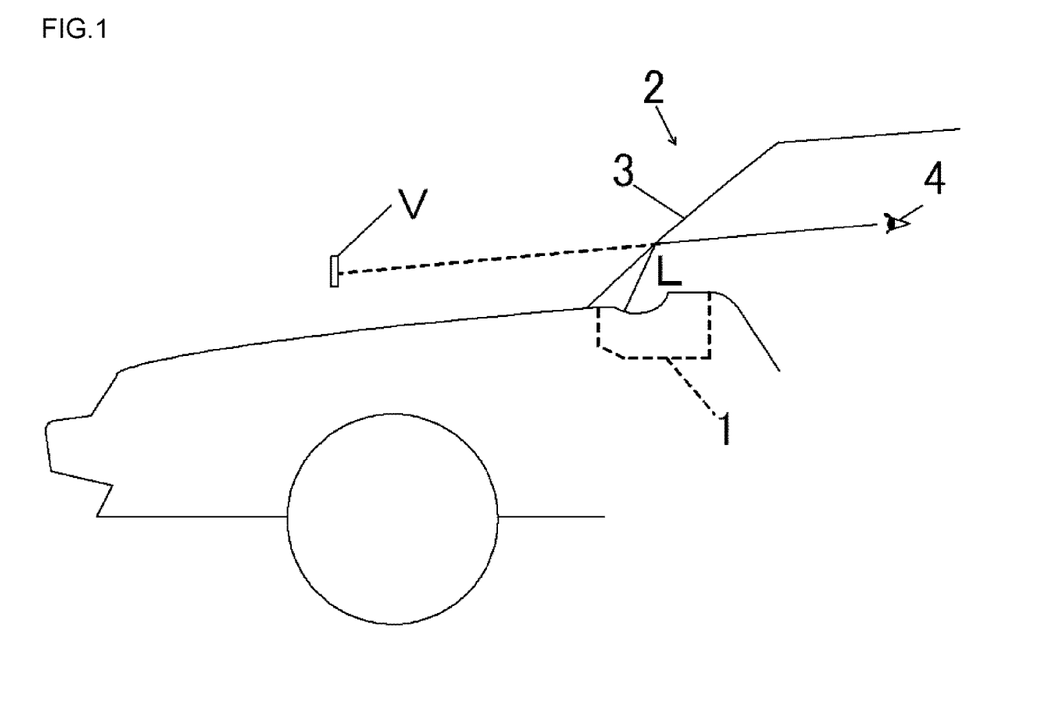
FIG. 1 is a schematic diagram of a vehicle on which a head-up display (HUD) device according to an embodiment of the present disclosure is mounted.

As illustrated in FIG. 1, a head-up display (HUD) device 1 is mounted on a dashboard of a vehicle 2 to emit display light L toward a windshield 3 of the vehicle 2. The display light L reflected by the windshield 3 causes a user 4 (e.g., a driver of the vehicle 2) to visually recognize a virtual image V of the image represented by the display light L. The virtual image V is displayed in front of the vehicle 2 through the windshield 3. This allows the user 4 to visually recognize the virtual image V that is displayed on the scenery ahead in a superimposed manner. The virtual image V presents various types of information about the vehicle 2, such as the vehicle speed and the engine speed.

Figure 2:
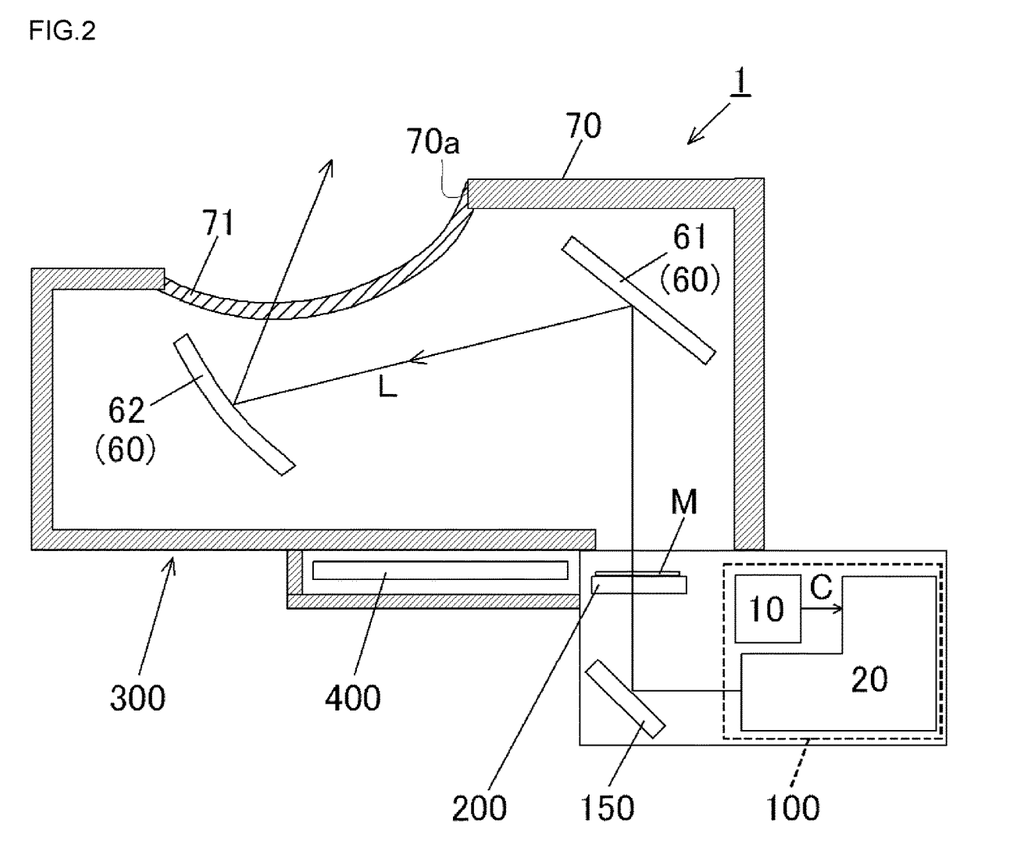
FIG. 2 is a schematic diagram illustrating a configuration of the HUD device according to the embodiment.

As illustrated in FIG. 2, the HUD device 1 includes a projector device 100 that emits the display light L, a screen 200 onto which an image M represented by the display light L is projected, a planar mirror 150 that reflects the display light L emitted from the projector device 100 toward the screen 200, a light guide device 300 that guides the display light L transmitted through the screen 200 to the windshield 3, and a control device 400 that controls an operation of the HUD device 1.

The projector device 100 includes an illumination device 10 and a display unit 20 that is illuminated by the illumination device 10 to emit the display light L.

Figure 3:
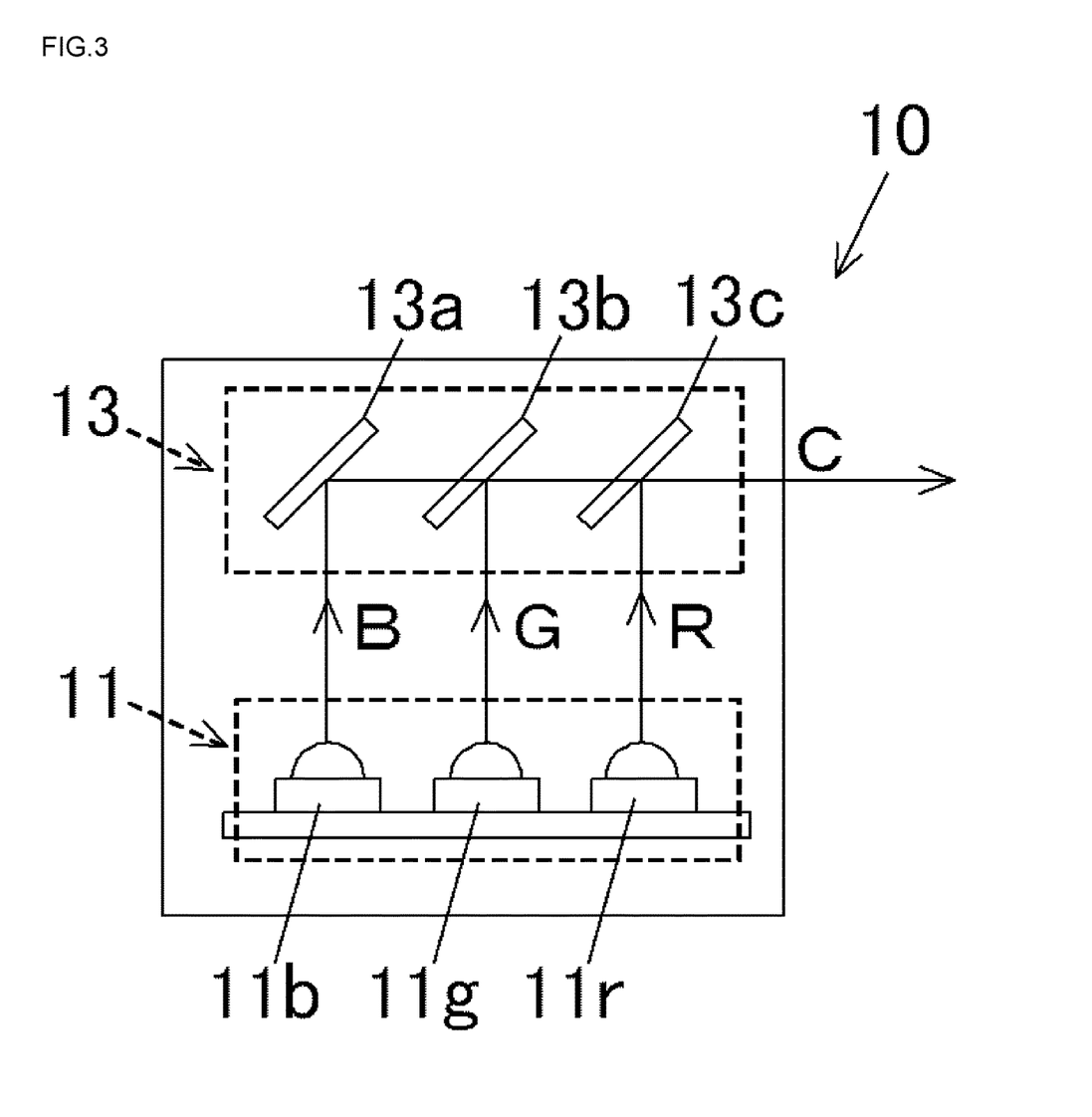
FIG. 3 is a schematic diagram illustrating a configuration of an illumination device according to the embodiment.

The illumination device 10 generates illumination light C and emits the generated illumination light C toward the display unit 20. The illumination device 10 includes a light source unit 11 and a light combination unit 13, as illustrated in FIG. 3.

The light source unit 11 includes three light-emitting diodes 11*r*, 11*g*, and 11*b* (hereinafter referred to as LEDs) in different lighting colors from each other. The LED 11*r* lights up to emit red light R. The LED 11*g* lights up to emit green light G. The LED 11*b* lights up to emit blue light B. Each of the LEDs 11*r*, 11*g*, and 11*b* is driven by the control device 400 to emit light with a predetermined light intensity and at a predetermined timing.

The light combination unit 13 matches the optical axes of the red light R, the green light G, and the blue light B, which are sequentially emitted from the LEDs 11*r*, 11*g*, and 11*b*, to generate the illumination light C and emits the generated illumination light C toward the display unit 20. The light combination unit 13 includes a reflecting mirror 13*a* and dichroic mirrors 13*b* and 13*c*. The reflecting mirror 13*a* reflects the incident blue light B toward the dichroic mirror 13*b*. The dichroic mirror 13*b* reflects the incident green light G toward the dichroic mirror 13*c* while transmitting the blue light B from the reflecting mirror 13*a* without change. The dichroic mirror 13*c* reflects the incident red light R toward the display unit 20 while transmitting the green light G and the blue light B from the dichroic mirror 13*b*. Accordingly, the dichroic mirror 13*c* emits the illumination light C, which is the combination of the red light R, the green light G, and the blue light B, toward the display unit 20.

Figure 4:
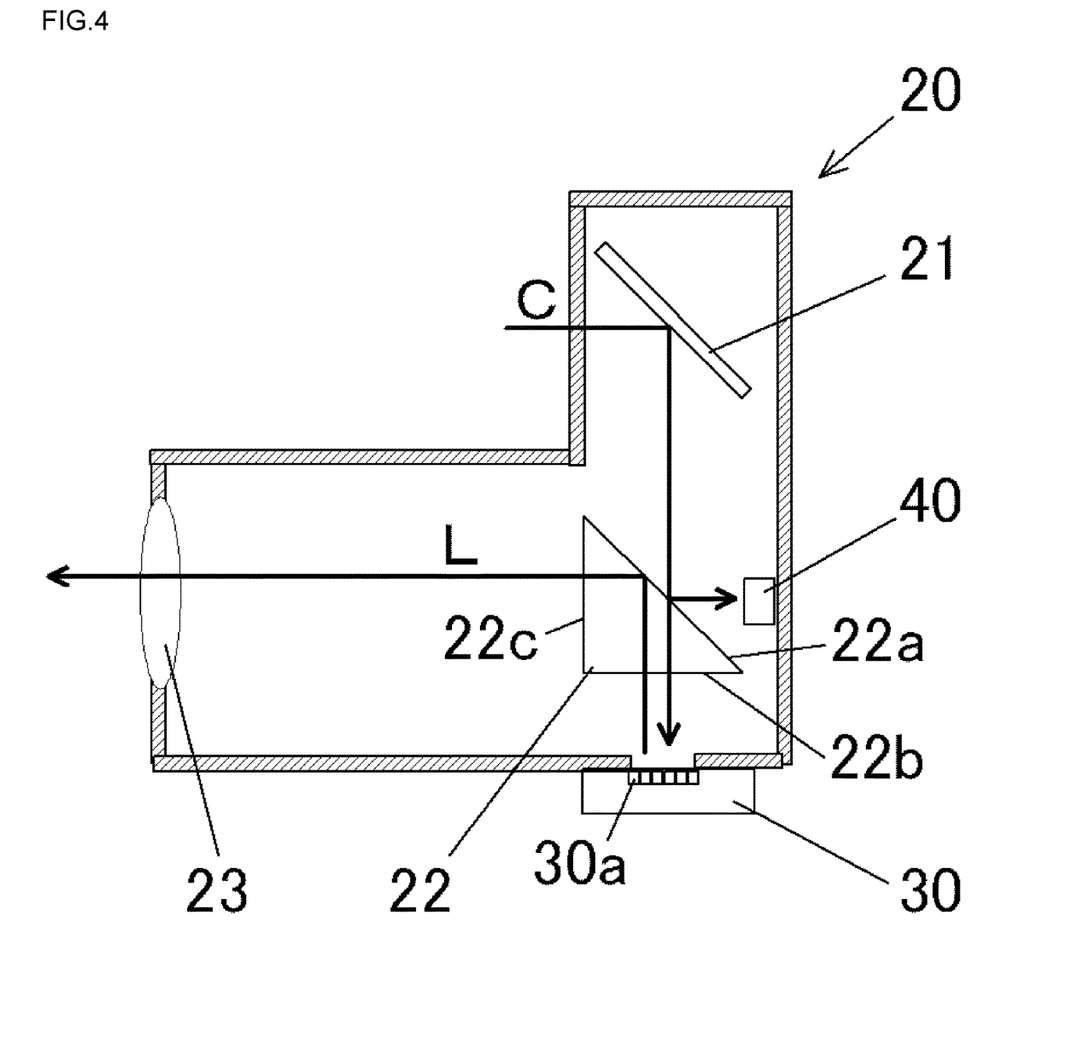
FIG. 4 is a schematic diagram illustrating a configuration of a display unit according to the embodiment.

As illustrated in FIG. 4, the display unit 20 includes a planar mirror 21, a prism 22, a lens 23, a display element 30 that generates the display light L, and a light intensity detection unit 40.

The planar mirror 21 reflects the illumination light C from the illumination device 10 toward the prism 22. The prism 22 is formed in the shape of a triangular prism, including an inclined surface 22*a* facing the planar mirror 21, an orthogonal surface 22*b* facing the display element 30, and an orthogonal surface 22*c* facing the lens 23. The inclined surface 22*a* causes most of the illumination light C from the planar mirror 21 to enter the prism 22 and reflects part of the illumination light C from the planar mirror 21 toward the light intensity detection unit 40. The illumination light C having entered the prism 22 is emitted toward the display element 30 through the orthogonal surface 22*b* of the prism 22.

Figure 5:
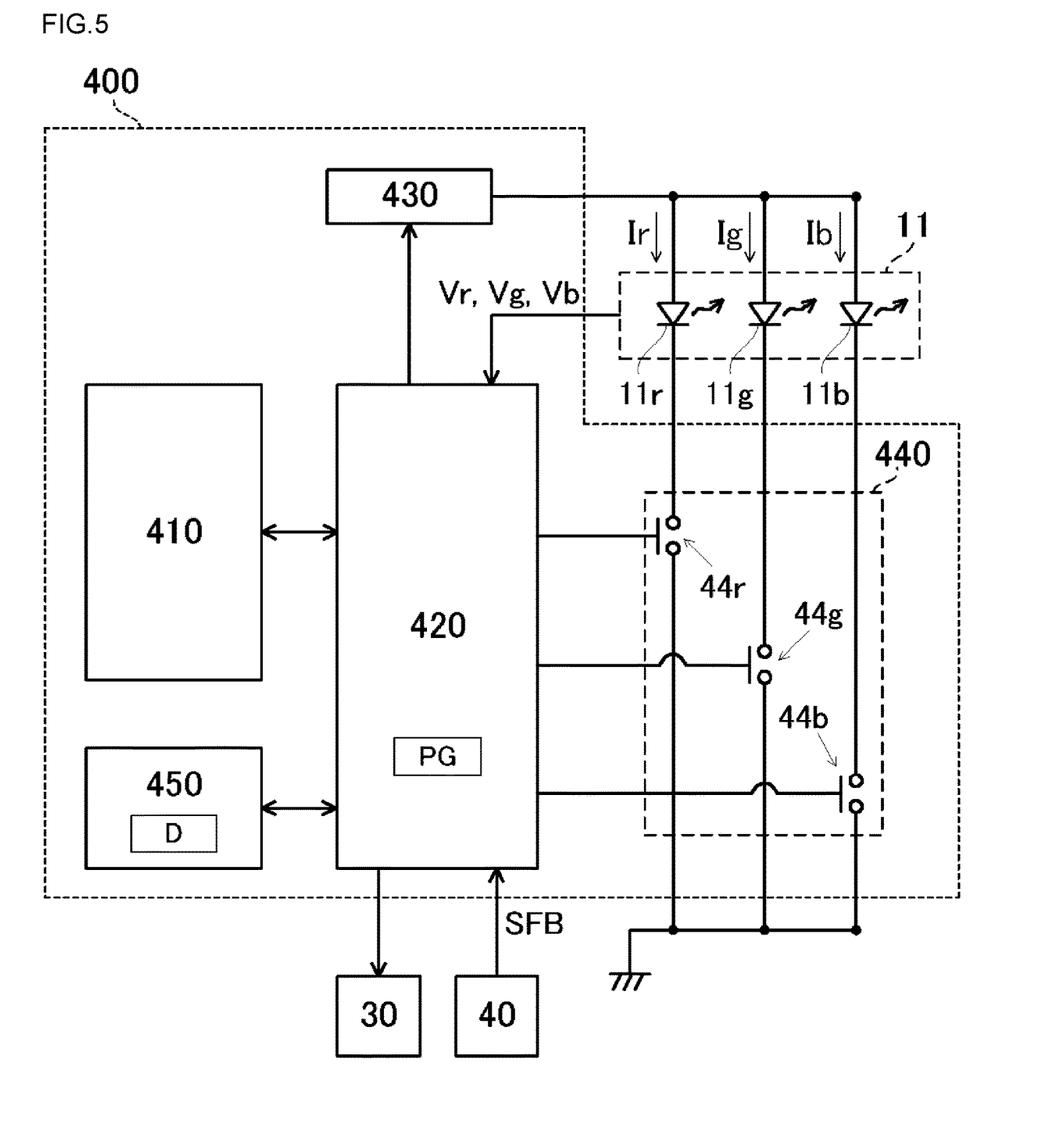
FIG. 5 is a block diagram illustrating a configuration of a control device according to the embodiment.

The light intensity detection unit 40 includes a photodiode or phototransistor to detect the emission luminance of each of the lights R, G, and B, which constitute the illumination light C incident on the prism 22, in a time-division manner. As illustrated in FIG. 5, the light intensity detection unit 40 outputs the detection result as a light intensity detection signal SFB to a display control unit 420, described below, of the control device 400.

The display element 30 includes a DMD (Digital Micromirror Device) and includes a plurality of movable micromirrors 30*a*. The micromirrors 30*a* are arranged in a matrix to correspond to the pixels of the image M to be projected onto the screen 200. The micromirror 30*a* is set to either the ON or OFF state under the control of the control device 400. The micromirror 30*a* in the ON state reflects the illumination light C toward the screen 200. The micromirror 30*a* in the OFF state reflects the illumination light C in a direction so as not to reach the screen 200. The period of the ON state of each of the micromirrors 30*a* is adjusted to represent the color of each pixel of the image M. As described above, the display element 30 uses the combination of the micromirrors 30*a* in the ON and OFF states to generate the display light L representing the image M based on the illumination light C.

The display light L generated by the display element 30 is reflected by the inclined surface 22a after entering the orthogonal surface 22b of the prism 22, and is emitted through the lens 23 to outside the projector device 100. The lens 23 includes a convex lens, a concave lens, etc., to enlarge the display light L. The display light L, which is transmitted through the lens 23 to be enlarged, is reflected by the planar mirror 150 toward the screen 200.

The screen 200 is a transmissive screen, including a holographic diffuser, a microlens array, a diffuser plate, etc. The display light L emitted from the projector device 100 is projected on the screen 200 as the image M and is transmitted through the screen 200 to the light guide device 300.

The light guide device 300 includes a reflection unit 60 that reflects the display light L emitted from the screen 200 toward the windshield 3 and a chassis 70 that accommodates the reflection unit 60. The reflection unit 60 includes a planar mirror 61 and a concave mirror 62. The planar mirror 61 reflects the display light L from the screen 200 toward the concave mirror 62. The concave mirror 62 reflects the display light L from the planar mirror 61 toward the windshield 3. With the display light L reflected by the concave mirror 62, the virtual image V visually recognized by the user 4 is enlarged from the image M projected onto the screen 200. The chassis 70 is formed of for example a light-shielding material in a box shape, including an opening 70a through which the display light L reflected by the concave mirror 62 passes. The chassis 70 includes a cover glass 71 that covers the opening 70a and allows passage of the display light L. Furthermore, a chassis, not illustrated, of the projector device 100 is coupled to the chassis 70 of the light guide device 300, for example.

As illustrated in FIG. 5, the control device 400 includes an MCU (Micro Controller Unit) 410 and the display control unit 420, which communicate with each other, an LED driver 430 and a switching element 440, which are operated under the control of the display control unit 420, and a storage unit 450 coupled to the display control unit 420.

The LED driver 430 includes for example a driver IC to adjust the voltage value applied to the light source unit 11 based on the power from a battery, not illustrated, mounted on the vehicle 2.

The switching element 440 includes, for example, a switching circuit using an n-type channel or p-type channel FET (Field Effect Transistor). The switching element 440 includes switches 44r, 44g, and 44b that are coupled to the cathode side of the LEDs 11r, 11g, and 11b. Each of the switches 44r, 44g, and 44b is switched between the ON state and the OFF state under the control of the display control unit 420. When the switch 44r is in the ON state, a drive current Ir is supplied to the LED 11r from the LED driver 430 to turn on the LED 11r. Conversely, when the switch 44r is in the OFF state, the drive current Ir to the LED 11r is cut off to turn off the LED 11r. The same applies to the correspondence relation between the state of the switch 44g and a drive current Ig supplied to the LED 11g and the correspondence relation between the state of the switch 44b and a drive current Ib supplied to the LED 11b.

The MCU 410 generates a target luminance signal indicating the target luminance of the light source unit 11 for properly displaying the virtual image V based on the ambient light intensity around the vehicle 2 detected by an illuminance sensor, not illustrated, and outputs it to the display control unit 420. The MCU 410 may control the rotational displacement or parallel displacement of the concave mirror 62 via a mechanism not illustrated to adjust the display position of the virtual image V.

The display control unit 420 is an LSI (Large Scale Integration) that performs a desired function in hardware and that includes, for example, an ASIC (Application Specific Integrated Circuit) and FPGA (Field Programmable Gate Array). A ROM (Read Only Memory) built into the display control unit 420 stores programs for driving the light source unit 11 and the display element 30 and a program PG for executing an LED diagnostic process described below. The display control unit 420 receives the input of a video signal for displaying the image M from an external device such as an ECU (Electronic Control Unit) mounted on the vehicle 2 and receives the input of the light intensity detection signal SFB from the light intensity detection unit 40.

The storage unit 450 is a non-volatile memory including a flash memory, EEPROM (Electrically Erasable Programmable ROM), etc. that stores fixed data used by the display control unit 420 to execute various processes, such as data of lighting pattern information D described below. The storage unit 450 may be built in the display control unit 420.

Figure 6:
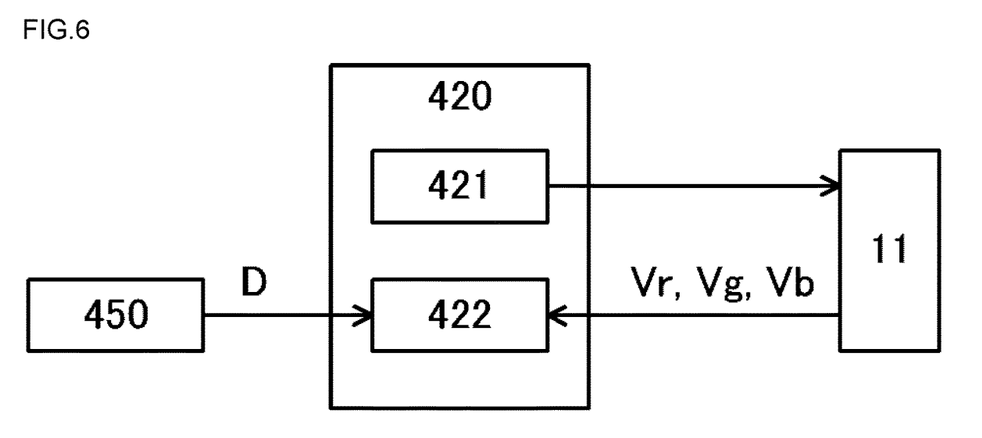
FIG. 6 is a block diagram illustrating a function of a display control unit according to the embodiment.

The display control unit 420 controls ON/OFF of each of the micromirrors 30a of the display element 30 based on the video signal. As other primary functions, the display control unit 420 includes a drive control unit 421 and a voltage measurement unit 422 as illustrated in FIG. 6.

Figure 8:
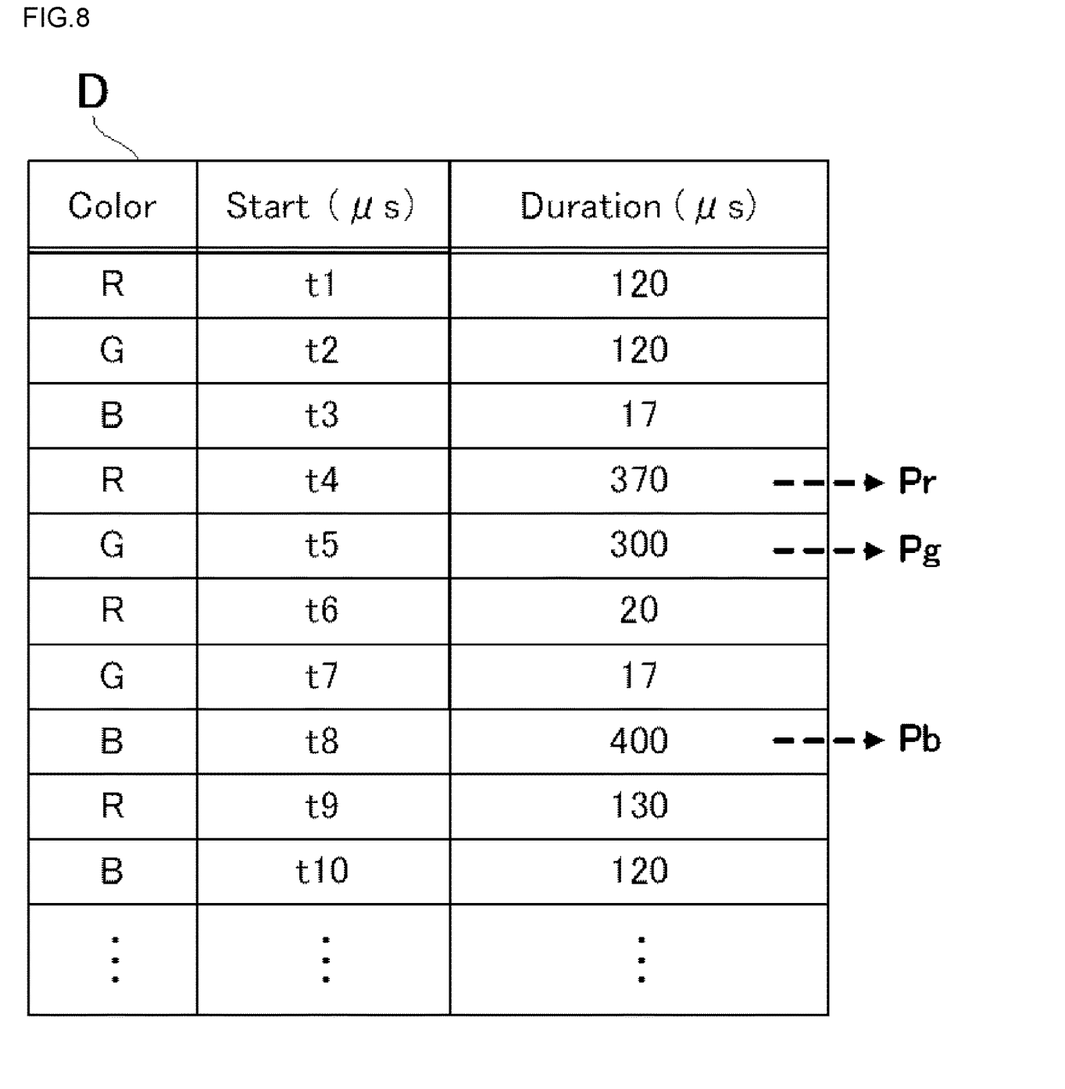
FIG. 8 is a table illustrating an example of a structure of lighting pattern information according to the embodiment.

The drive control unit 421 controls the driving of the light source unit 11. The drive control unit 421 refers to the lighting pattern information D stored in the storage unit 450 and lights the LEDs 11r, 11g, and 11b in the lighting patterns indicated by the lighting pattern information D. The lighting pattern information D is information for lighting each of the LEDs 11r, 11g, and 11b in preset lighting patterns to emit the display light L in the desired color. The drive control unit 421 refers to the lighting pattern information D and selects an appropriate lighting pattern corresponding to the video signal. As illustrated in FIG. 8, the lighting pattern information D indicates a time sequence of a lighting start timing (Start described in the figure) of each of the LEDs 11r, 11g, and 11b and a lighting duration period (Duration described in the figure) from the lighting start timing.

Figure 9:
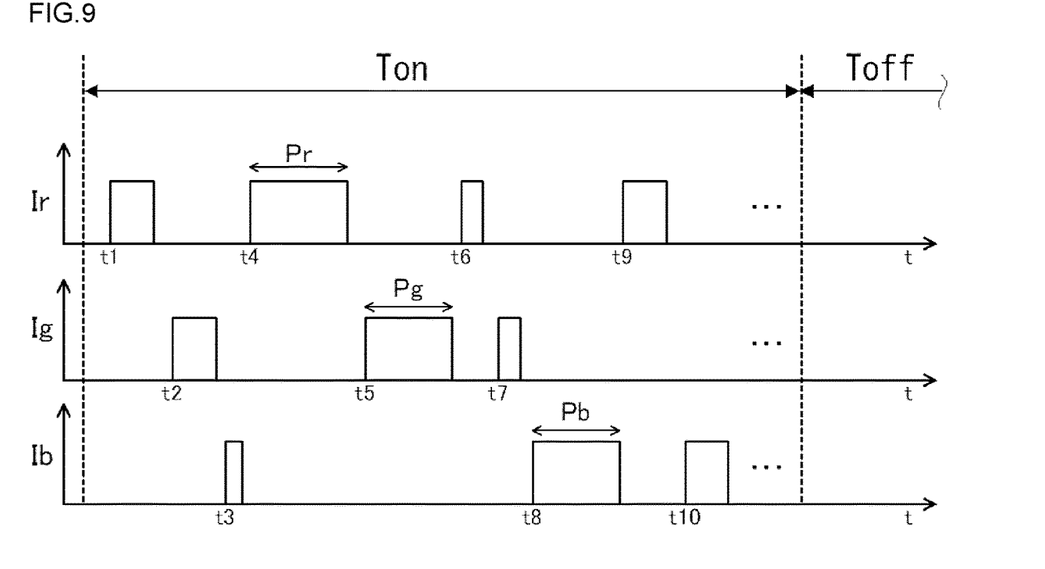
FIG. 9 is a graph illustrating supply timings of drive currents based on the lighting pattern information in FIG. 8.

FIG. 9 is a diagram illustrating the supply timings of the drive currents Ir, Ig, and Ib, represented corresponding to the lighting start timing and the lighting duration period described in the lighting pattern information D in FIG. 8. The drive control unit 421 sets the switch 44r in the ON state until the lighting duration period has elapsed from the lighting start timing of the red light R to supply the drive current Ir to the LED 11r. Accordingly, the LED 11r lights up during the lighting duration period of the red light R. Conversely, in a period other than the lighting duration period of the red light R, the drive control unit 421 sets the switch 44r in the OFF state. Accordingly, the LED 11r is turned off in a period other than the lighting duration period of the red light R. The drive control unit 421 controls the LEDs 11g and 11b in the same manner to light the LEDs 11g until the lighting duration period has elapsed from the lighting start timing of the green light G and light the LED 11b until the lighting duration period has elapsed from the lighting start timing of the blue light B. Thus, the drive control unit 421 selectively lights any one of the LEDs 11r, 11g, and 11b and sequentially switches the LEDs 11r, 11g, and 11b in a lighted state, i.e., drives the light source unit 11 in a field-sequential method. In the field-sequential method, a frame (frame period), which is a display cycle of the image M, includes a display period Ton, during which the display control unit 420 sequentially lights the light source unit 11 and causes the display element 30 to generate the image M, and a non-display period Toff, during which the display control unit 420 continues the OFF state of the light source unit 11 and does not cause the display element 30 to generate the image M. The one display period Ton and the one non-display period Toff constitute one frame.

Furthermore, the drive control unit 421 compares the target luminance indicated by the target luminance signal with the emission luminance indicated by the light intensity detection signal SFB and, in order to cause the light source unit 11 to emit the light having the target luminance, performs feedback control on the current value supplied from the LED driver 430 to the light source unit 11.

Figure 7:
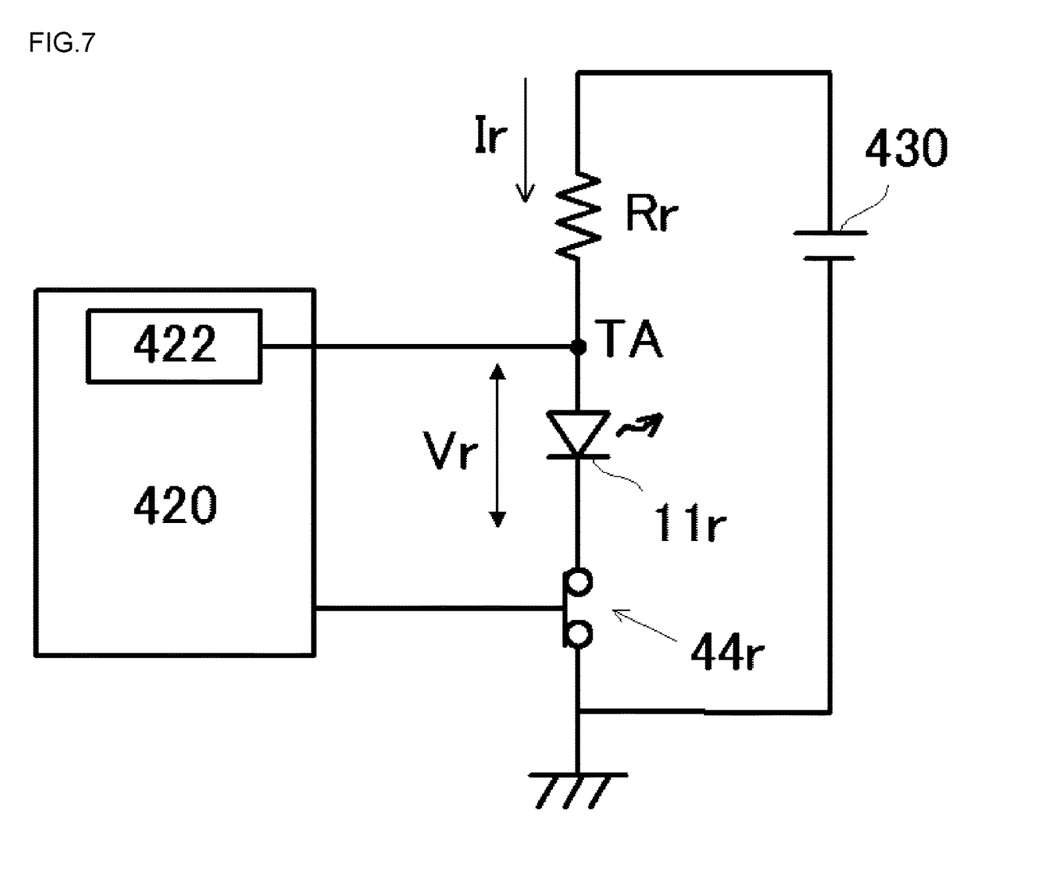
FIG. 7 is a schematic circuit diagram illustrating a function of a voltage measurement unit according to the embodiment.

The voltage measurement unit 422 measures forward voltages Vr, Vg, and Vb of the respective LEDs 11r, 11g, and 11b. FIG. 7 illustrates a schematic circuit diagram illustrating the function of the voltage measurement unit 422 that measures the forward voltage Vr of the LED 11r. An anode of the LED 11r is coupled to the LED driver 430 via a resistor Rr. A cathode of the LED 11r is grounded via the switch 44r. The anode of the LED 11r is coupled to an A/D (Analog to Digital) port of the display control unit 420 via a terminal TA that is coupled between the anode and the resistor Rr. The thus coupled display control unit 420 obtains the anode voltage of the LED 11r from the terminal TA by the function of the voltage measurement unit 422. The voltage measurement unit 422 measures the anode voltage during the period in which the switch 44r is in the ON state. Therefore, the anode voltage measured by the voltage measurement unit 422 is the voltage between the cathode and the anode of the LED 11r, that is, the forward voltage Vr (also referred to as forward-direction voltage). With the same configuration, the voltage measurement unit 422 also measures the forward voltage Vg of the LED 11g and the forward voltage Vb of the LED 11b.

The voltage measurement unit 422 refers to the lighting pattern information D and determines that the lighting duration periods longer than a preset setting period Pm are target periods Pr, Pg, and Pb for measuring the forward voltages Vr, Vg, and Vb. According to the present embodiment, it is determined that the longest periods among the lighting duration periods within one frame are the target periods Pr, Pg, and Pb. FIG. 8 is an example illustrating a part of the lighting pattern for one frame, and it is assumed that, with regard to the lighting color R, the lighting duration period "370 μs" starting at a lighting timing t4 is the longest lighting duration period within one frame. In this case, the voltage measurement unit 422 determines that the lighting duration period starting at the lighting timing t4 is the target period Pr. With regard to the lighting color G, it is assumed that the lighting duration period "300 μs" starting at a lighting timing t5 is the longest lighting duration period within one frame. In this case, the voltage measurement unit 422 determines that the lighting duration period starting at the lighting timing t5 is the target period Pg. With regard to the lighting color B, it is assumed that the lighting duration period "400 μs" starting at a lighting timing t8 is the longest lighting duration period within one frame. In this case, the voltage measurement unit 422 determines that the lighting duration period starting at the lighting timing t8 is the target period Pb. The target periods Pr, Pg, and Pb within a predetermined frame are determined before the start of the predetermined frame.

Figure 10:
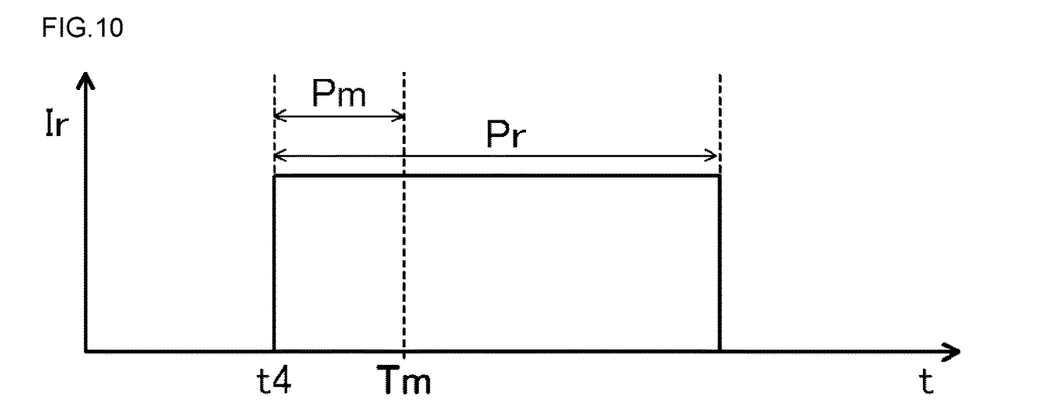
FIG. 10 is a schematic diagram illustrating a voltage measurement timing according to the embodiment.

Furthermore, the voltage measurement unit 422 executes a voltage measurement process to measure the forward voltages Vr, Vg, and Vb within the determined target periods Pr, Pg, and Pb at the timings after the setting period Pm has elapsed from the start of the periods. FIG. 10 illustrates a measurement timing Tm of the forward voltage Vr within the determined target period Pr. The voltage measurement unit 422 measures the forward voltage Vr at the timing Tm after the setting period Pm has elapsed from the lighting timing t4. The setting period Pm is for example a period of approximately 20 to 60 μs, which is defined as an appropriate period to obtain a stable voltage to be measured. The forward voltages Vg and Vb within the determined target periods Pg and Pb are also measured at the same timing as above. Further, the setting period Pm may be an appropriate value defined for each of the LEDs 11r, 11g, and 11b or a value common to the LEDs 11r, 11g, and 11b. The LED diagnostic process including the voltage measurement process will be described below with reference to the flowchart in FIG. 11. The LED diagnostic process is performed by the display control unit 420 functioning as the voltage measurement unit 422.

Figure 11:
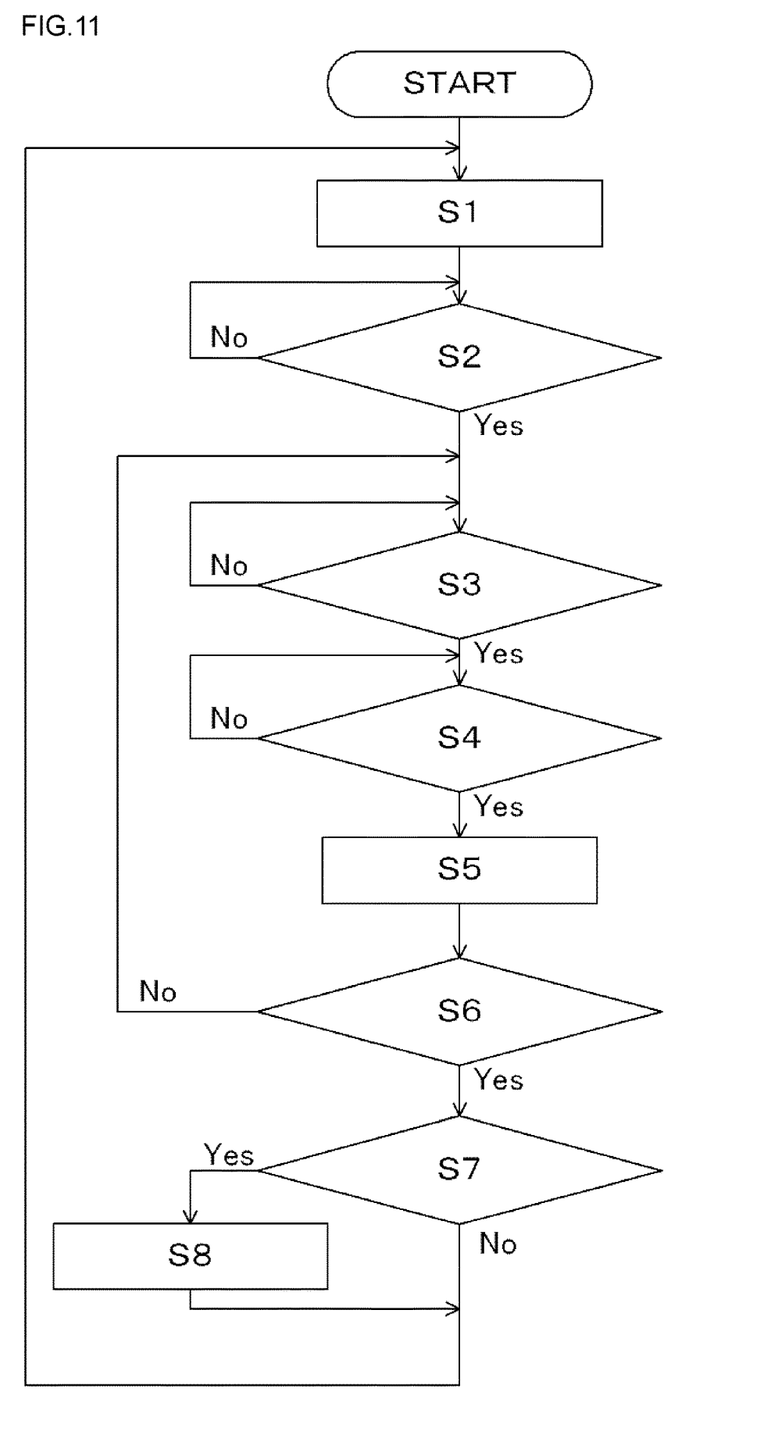
FIG. 11 is a flowchart illustrating an LED diagnostic process according to the embodiment.

After starting the LED diagnostic process illustrated in the flowchart of FIG. 11, the voltage measurement unit 422 first refers to the lighting pattern information D and determines that the longest periods among the lighting duration periods within one frame are the target periods Pr, Pg, and Pb (Step S1).

Subsequently, the voltage measurement unit 422 determines whether the frames (hereinafter referred to as target frames) including the target periods Pr, Pg, and Pb have started (Step S2). The voltage measurement unit 422 may specify whether the target frame has started based on for example a vertical synchronization signal included in a video signal. When the target frame has not started (Step S2; No), the voltage measurement unit 422 waits. Conversely, when the target frame has started (Step S2; Yes), the voltage measurement unit 422 determines whether any of the target periods Pr, Pg, and Pb has started (Step S3). Hereinafter, for ease of understanding of the description, it is assumed that the target periods Pr, Pg, and Pb start in accordance with the lighting pattern illustrated in FIG. 8. In such a case, at Step S3, it is determined whether the target period Pr has started (whether the lighting timing t4 has come).

When the target period Pr has not started (Step S3; No), the voltage measurement unit 422 waits. Conversely, when the target period Pr has started (Step S3; Yes), the voltage measurement unit 422 determines whether the setting period Pm has elapsed from the start (the lighting timing t4) of the target period Pr (Step S4).

When the setting period Pm has not elapsed (Step S4; No), the voltage measurement unit 422 waits. Conversely, when the setting period Pm has elapsed (Step S4; Yes), the voltage measurement unit 422 executes the voltage measurement process to measure the forward voltage Vr of the LED 11r (Step S5).

Subsequently, the voltage measurement unit 422 determines whether all of the forward voltages Vr, Vg, and Vb corresponding to the respective lighting colors (i.e., the red light R, the green light G, and the blue light B) have been measured in the target frame (Step S6). When all of the forward voltages Vr, Vg, and Vb have not been measured yet (Step S6; No), the voltage measurement unit 422 repeatedly performs the process from Steps S3 to S5 until all of the forward voltages Vr, Vg and Vb are done. Specifically, in accordance with the lighting pattern illustrated in FIG. 8, after measuring the forward voltage Vr, the voltage measurement unit 422 repeatedly performs the process from Steps S3 to S5 to measure the forward voltage Vg of the LED 11g at the timing when the setting period Pm has elapsed from the start (the lighting timing t5) of the target period Pg and measure the forward voltage Vb of the LED 11b at the timing when the setting period Pm has elapsed from the start (the lighting timing t8) of the target period Pb. As described above, the voltage measurement unit 422 performs the voltage measurement process for each of the lighting colors of the LEDs 11r, 11g, and 11b.

When all of the forward voltages Vr, Vg, and Vb have been measured in the target frame (Step S6; Yes), the voltage measurement unit 422 determines whether the LEDs 11r, 11g, 11b are faulty based on the measured forward voltages Vr, Vg, and Vb (Step S7). For example, the ROM of the display control unit 420 functioning as the voltage measurement unit 422 stores the threshold for specifying a short circuit and the threshold for specifying a poor connection for each of the LEDs 11r, 11g, and 11b, and the voltage measurement unit 422 determines whether each of the LEDs 11r, 11g, and 11b is faulty based on these thresholds.

When at least any of the LEDs 11r, 11g, and 11b is faulty (Step S7; Yes), the voltage measurement unit 422 reports the faulty LED and the details of the fault to the MCU 410 (Step S8). When none of the LEDs 11r, 11g, and 11b are faulty (Step S7; No) or after Step S8 is executed, the voltage measurement unit 422 returns to the process at Step S1. The voltage measurement unit 422 continuously performs the above LED diagnostic process during the display operation of the HUD device 1.

Furthermore, the present disclosure is not limited to the above embodiments and drawings. Modifications (including deletion of components) may be made as appropriate as long as the scope of this disclosure is not changed.

In the example described above, the drive control unit 421 and the voltage measurement unit 422 are implemented as the functions of the display control unit 420, but at least some of the functions of the drive control unit 421 and the voltage measurement unit 422 may be implemented by the MCU 410. Further, the display control unit 420 and the MCU 410 may be configured by a single control unit.

In the example described above, it is determined that the longest periods among the lighting duration periods of the respective LEDs 11r, 11g, and 11b within the frame period are the target periods Pr, Pg, and Pb, but this is not a limitation. The target periods Pr, Pg, and Pb may be any periods longer than the setting period Pm.

In the example described above, the voltage measurement unit 422 performs the voltage measurement process only once for each of the LEDs 11r, 11g, and 11b within the frame periods, but this is not a limitation. The voltage measurement unit 422 may perform the voltage measurement process multiple times for each of the LEDs 11r, 11g, and 11b within the frame periods.

The voltage measurement unit 422 may also measure the forward voltage of the light intensity detection unit 40 including a photodiode or phototransistor in at least any timing among the measurement timings of the forward voltages Vr, Vg, and Vb of the LEDs 11r, 11g, and 11b. Then, the voltage measurement unit 422 may determine whether the light intensity detection unit 40 is faulty based on the measured forward voltage of the light intensity detection unit 40. For example, when the light intensity detection unit 40 is faulty, the display control unit 420 may shut down the system as it is difficult to perform feedback control on the current value.

A modification may be optionally made to the configuration of the optical system provided for the process of generating the display light L from the illumination light C and the process of guiding the display light L to the light guide device 300. Furthermore, the configuration of the reflection unit 60 that reflects the display light L toward the windshield 3 is also optional.

In the example described above, the HUD device 1 is mounted on the vehicle 2, but the HUD device 1 may be mounted on vehicles such as airplanes and ships other than the vehicle 2. Further, the translucent member to which the HUD device 1 emits the display light L may be other than the windshield 3 and may be for example a dedicated combiner.

It is assumed that the program PG that executes the LED diagnostic process described above is previously stored in the ROM of the display control unit 420, but it may also be distributed and provided in a removable recording medium. Furthermore, the program PG may also be downloaded from other devices coupled to the display control unit 420. Further, the data of the lighting pattern information D may also be downloaded from other devices coupled to the display control unit 420. Moreover, the display control unit 420 may exchange various types of data with other devices via a telecommunication network, or the like, to execute each process in accordance with the program.

(1) In the field-sequential projector device 100 described above, the voltage measurement unit 422 refers to the lighting pattern information D and determines that the lighting duration periods longer than the preset setting period Pm are the target periods Pr, Pg, and Pb. Further, the voltage measurement unit 422 executes the voltage measurement process to measure the forward voltages Vr, Vg, and Vb within the determined target periods Pr, Pg, and Pb at the timings after the setting period Pm has elapsed from the start of the periods.

With this configuration, it is possible to avoid the period in which the voltage becomes unstable immediately after the lighting timings of the LEDs 11r, 11g, and 11b, and it is possible to prevent the measurement of the forward voltages Vr, Vg, and Vb when the LEDs 11r, 11g, and 11b are turned off. Therefore, the forward voltage of the light-emitting diode may be measured during an appropriate lighting duration period.

(2) Specifically, the lighting duration period is shorter than the frame period that is the display cycle of the image M and includes a plurality of intermittent lighting duration periods within the frame period, and the voltage measurement unit 422 executes the voltage measurement process one or more times within the frame period (within one frame).

(3) Furthermore, the voltage measurement unit 422 determines that the longest periods among the lighting duration periods within the frame period are the target periods Pr, Pg, and Pb.

(4) Moreover, the light-emitting diode includes a plurality of light-emitting diodes that light up in different colors from each other, and the voltage measurement unit 422 executes the voltage measurement process for each of lighting colors (R, G, B) of the light-emitting diodes.

(5) The HUD device 1 described above includes the projector device 100 and emits the display light L toward a translucent member (e.g., the windshield 3) to display the virtual image V of the image M.

With the HUD device 1, it is also possible to measure the forward voltage of the light-emitting diode during an appropriate lighting duration period.

(6) The program PG described above causes a computer to function as a drive control means (e.g., the drive control unit 421) that lights a light-emitting diode included in the field-sequential projector device 100 in a preset lighting pattern based on the lighting pattern information D for lighting the light-emitting diode in the lighting pattern, and a voltage measurement means (e.g., the voltage measurement unit 422) that measures the forward voltage of the light-emitting diode. The voltage measurement means refers to the lighting pattern information D and determines that the lighting duration periods longer than the preset setting period Pm are the target periods Pr, Pg, and Pb, and measures the forward voltages Vr, Vg, and Vb within the determined target periods Pr, Pg, and Pb at the timings after the setting period Pm has elapsed from the start of the periods.

With the program PG, it is also possible to measure the forward voltage of the light-emitting diode during an appropriate lighting duration period.

(7) The voltage measurement method using the display control unit 420 described above includes a step of lighting the light-emitting diode included in the field-sequential projector device 100 in a preset lighting pattern based on the lighting pattern information D for lighting the light-emitting diode in the lighting pattern, and a voltage measurement step of measuring the forward voltage of the light-emitting diode. The voltage measurement step refers to the lighting pattern information D and determines that the lighting duration periods longer than the preset setting period Pm are the target periods Pr, Pg, and Pb, and measures the forward voltages Vr, Vg, and Vb within the determined target periods Pr, Pg, and Pb at the timings after the setting period Pm has elapsed from the start of the periods.

With the voltage measurement method, it is also possible to measure the forward voltage of the light-emitting diode during an appropriate lighting duration period.

In the above description, in order to facilitate understanding of the present invention, the description of known technical matters are omitted as appropriate.

DESCRIPTION OF REFERENCE NUMERALS

1 . . . HUD device
2 . . . Vehicle
3 . . . Windshield
4 . . . User
100 . . . Projector device
10 . . . Illumination device
11r, 11g, 11b . . . Light-emitting diode (LED)
20 . . . Display unit
30 . . . Display element
40 . . . Light intensity detection unit
200 . . . Screen
300 . . . Light guide device
400 . . . Control device
410 . . . MCU
420 . . . Display control unit
PG . . . Program
421 . . . Drive control unit
422 . . . Voltage measurement unit
430 . . . LED driver
440 . . . Switching element
44r, 44g, 44b . . . Switch
450 . . . Storage unit
D . . . Lighting pattern information
C . . . Illumination light
R . . . Red light
G . . . Green light
B . . . Blue light
L . . . Display light
M . . . Image
V . . . Virtual image
Pr, Pg, Pb . . . Target period
Pm . . . Setting period
Vr, Vg, Vb . . . Forward voltage
Ir, Ig, Ib . . . Drive current

The invention claimed is:

1. A field-sequential projector device comprising:
a light-emitting diode;
a storage that stores lighting pattern information that is information for lighting the light-emitting diode in a preset lighting pattern and that indicates a time sequence of a lighting start timing of the light-emitting diode and a lighting duration period from the lighting start timing;
a computer that drives the light-emitting diode to emit light based on the lighting pattern in the lighting pattern information; and
a display element that generates display light representing an image based on the light emitted by the light-emitting diode,
wherein the computer:
determines, based on the lighting pattern information, the lighting duration period longer than a preset setting period as a target period;
executes a voltage measurement process to measure a forward voltage of the light-emitting diode within the determined target period at a timing after the setting period has elapsed from start of the period; and
executes the voltage measurement process while a drive current of the light-emitting diode is increased for lighting.

2. The projector device according to claim 1, wherein
the lighting duration period is shorter than a frame period that is a display cycle of the image and includes a plurality of intermittent lighting duration periods within the frame period, and
the computer executes the voltage measurement process one or more times within the frame period.

3. The projector device according to claim 2, wherein the computer determines a longest period among the lighting duration periods within the frame period as the target period.

4. The projector device according to claim 2, wherein the computer determines a longer period than the setting period among the lighting duration periods within the frame period as the target period.

5. The projector device according to claim 1, wherein
the light-emitting diode includes a plurality of lighting-emitting diodes that light up in different colors from each other, and
the computer executes the voltage measurement process for each of lighting colors of the light-emitting diodes.

6. A head-up display device comprising the projector device according to claim 1, wherein
the head-up display device emits the display light toward a translucent member to display a virtual image of the image.

7. The projector device according to claim 1, wherein the computer executes the voltage measurement process multiples times within a frame period.

8. A non-transitory computer readable storage medium storing programs that, when executed by a computer, cause the computer to:
light a light-emitting diode included in a field-sequential projector device based on a preset lighting pattern in lighting pattern information for lighting the light-emitting diode in the lighting pattern, wherein the lighting pattern information indicates a time sequence of a lighting start timing of the light-emitting diode and a lighting duration period from the lighting start timing, and wherein the computer:
determines, based on the lighting pattern information, the lighting duration period longer than a preset setting period as a target period, and measures a forward voltage within the determined target period at a timing after the setting period has elapsed from start of the period; and executes the forward voltage measurement while a drive current of the light-emitting diode is increased for lighting.

9. A voltage measurement method comprising:
a step of lighting a light-emitting diode included in a field-sequential projector device in a preset lighting pattern based on lighting pattern information for lighting the light-emitting diode in the lighting pattern, wherein the lighting pattern information indicates a time sequence of a lighting start timing of the light-emitting diode and a lighting duration period from the lighting start timing; and a voltage measurement step of i) determining, based on the lighting pattern information, the lighting duration period longer than a preset setting period as a target period, ii) measuring a forward voltage within the determined target period at a timing after the setting period has elapsed from start of the period, and iii) executing the forward voltage measurement while a drive current of the light-emitting diode is increased for lighting.

* * * * *